US012585784B2

(12) United States Patent　　(10) Patent No.:　US 12,585,784 B2

Philips et al.　　(45) Date of Patent:　Mar. 24, 2026

(54) SYSTEM FOR COMPONENT-LEVEL THREAT ASSESSMENT IN A COMPUTING ENVIRONMENT

(71) Applicant: BANK OF AMERICA CORPORATION, Charlotte, NC (US)

(72) Inventors: Darren Roy Philips, Singapore (SG); Ryan W. Nielsen, Denver, CO (US); Min Cao, Singapore (SG)

(73) Assignee: BANK OF AMERICA CORPORATION, Charlotte, NC (US)

( * ) Notice: Subject to any disclaimer, the term of this patent is extended or adjusted under 35 U.S.C. 154(b) by 333 days.

(21) Appl. No.: 18/131,757

(22) Filed: Apr. 6, 2023

(65) Prior Publication Data

US 2024/0338454 A1　　Oct. 10, 2024

(51) Int. Cl.
G06F 21/57　　(2013.01)
G06F 21/55　　(2013.01)

(52) U.S. Cl.
CPC .......... G06F 21/577 (2013.01); G06F 21/554 (2013.01); *G06F 2221/034* (2013.01)

(58) Field of Classification Search
CPC . G06F 21/577; G06F 21/554; G06F 2221/034
See application file for complete search history.

(56) References Cited

U.S. PATENT DOCUMENTS

| | | |
|---|---|---|
| 9,264,444 B2 | 2/2016 | Moore |
| 9,705,849 B2 | 7/2017 | Sood |

| | | |
|---|---|---|
| 9,807,109 B2 | 10/2017 | Laidlaw |
| 10,747,886 B2 | 8/2020 | El-Moussa |
| 10,791,141 B2 | 9/2020 | Peteroy |
| 11,368,473 B2 | 6/2022 | Weizman |
| 11,539,720 B2 | 12/2022 | Reybok, Jr. |
| 11,570,193 B2 | 1/2023 | Bhalerao |
| 11,671,443 B2 | 6/2023 | Mylavarapu |
| 11,683,333 B1 | 6/2023 | Dominessy |
| 11,838,311 B2 | 12/2023 | Grounds |
| 11,895,143 B2 | 2/2024 | Satish |
| 11,916,920 B2 | 2/2024 | Zaki |
| 2021/0092145 A1* | 3/2021 | Jaysingh ............. H04L 63/1425 |
| 2022/0159008 A1 | 5/2022 | Anbalagan |

(Continued)

*Primary Examiner* — Jason K Gee
*Assistant Examiner* — Judy Bazna
(74) *Attorney, Agent, or Firm* — Moore & Van Allen PLLC; Nicholas C. Russell

(57)　　ABSTRACT

Systems, computer program products, and methods are described herein for component-level threat assessment in a computing environment. The present disclosure is configured to capture state information associated with a computing environment; determine correlation measures for the components in the computing environment based on at least the state information; determine threat vectors associated with the components; determine mitigation protocols to be implemented on the components in response to an incidence of the threat vectors on the components; determine a first sequence in which the mitigation protocols are to be implemented based on at least the correlation measures for the components; and implement the mitigation protocols on the components in the first sequence to reduce a propagation effect of the threat vectors across the computing environment.

17 Claims, 4 Drawing Sheets

(56)          References Cited

U.S. PATENT DOCUMENTS

| | | |
|---|---|---|
| 2022/0385683 A1 | 12/2022 | Jones |
| 2023/0132802 A1* | 5/2023 | Zoualfaghari ...... H04L 41/0631 |
| | | 702/182 |
| 2023/0179635 A1 | 6/2023 | Schiel |
| 2023/0388338 A1 | 11/2023 | Satish |
| 2024/0111877 A1 | 4/2024 | Alimian |
| 2024/0112115 A1 | 4/2024 | Ladnai |
| 2024/0126892 A1 | 4/2024 | Bolukbas |

* cited by examiner

100

140

130

140

110

NETWORK

140

140

140

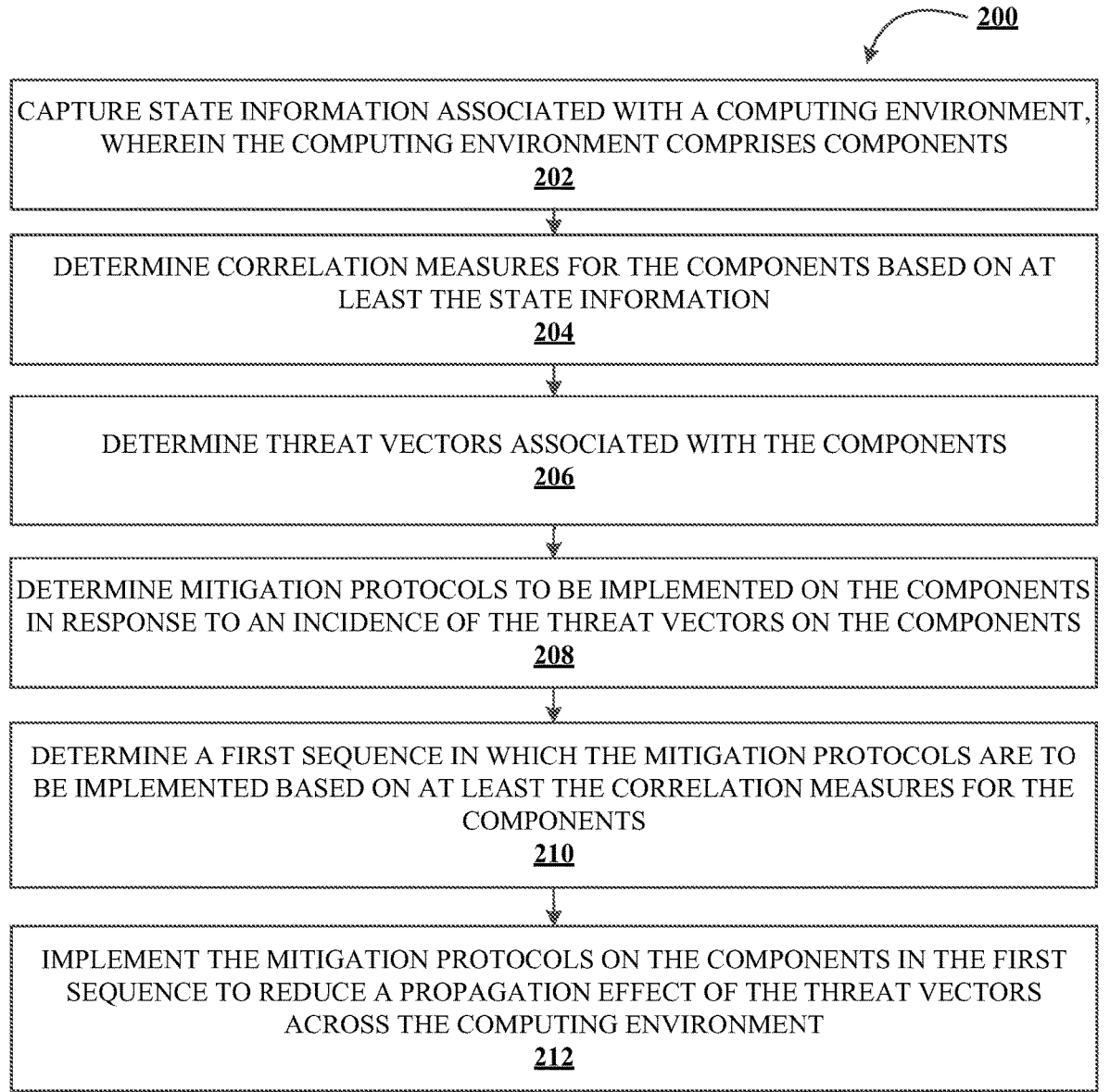

200

CAPTURE STATE INFORMATION ASSOCIATED WITH A COMPUTING ENVIRONMENT, WHEREIN THE COMPUTING ENVIRONMENT COMPRISES COMPONENTS
202

DETERMINE CORRELATION MEASURES FOR THE COMPONENTS BASED ON AT LEAST THE STATE INFORMATION
204

DETERMINE THREAT VECTORS ASSOCIATED WITH THE COMPONENTS
206

DETERMINE MITIGATION PROTOCOLS TO BE IMPLEMENTED ON THE COMPONENTS IN RESPONSE TO AN INCIDENCE OF THE THREAT VECTORS ON THE COMPONENTS
208

DETERMINE A FIRST SEQUENCE IN WHICH THE MITIGATION PROTOCOLS ARE TO BE IMPLEMENTED BASED ON AT LEAST THE CORRELATION MEASURES FOR THE COMPONENTS
210

IMPLEMENT THE MITIGATION PROTOCOLS ON THE COMPONENTS IN THE FIRST SEQUENCE TO REDUCE A PROPAGATION EFFECT OF THE THREAT VECTORS ACROSS THE COMPUTING ENVIRONMENT
212

FIGURE 2

SYSTEM FOR COMPONENT-LEVEL THREAT ASSESSMENT IN A COMPUTING ENVIRONMENT

TECHNOLOGICAL FIELD

Example embodiments of the present disclosure relate to component-level threat assessment in a computing environment.

BACKGROUND

In large scale computing environments (e.g., distributed computing environment), there exists an implicit web of dependencies between the components involved. Dependency Analysis in computing environments has been adapted to assess operability, reliability, and resilience at a component-level. Addressing these dependencies, and the complexities associated therewith, is an important consideration when performing component-level threat assessment that requires more help than traditional IT management software can provide.

Applicant has identified a number of deficiencies and problems associated with threat assessment in a computing environment. Through applied effort, ingenuity, and innovation, many of these identified problems have been solved by developing solutions that are included in embodiments of the present disclosure, many examples of which are described in detail herein

BRIEF SUMMARY

Systems, methods, and computer program products are provided for component-level threat assessment in a computing environment.

In one aspect, a system for component-level threat assessment in a computing environment is presented. The system comprising: a processing device; a non-transitory storage device containing instructions when executed by the processing device, causes the processing device to perform the steps of: capture state information associated with a computing environment, wherein the computing environment comprises components; determine correlation measures for the components based on at least the state information; determine threat vectors associated with the components; determine mitigation protocols to be implemented on the components in response to an incidence of the threat vectors on the components; determine a first sequence in which the mitigation protocols are to be implemented based on at least the correlation measures for the components; and implement the mitigation protocols on the components in the first sequence to reduce a propagation effect of the threat vectors across the computing environment.

In some embodiments, executing the instructions further causes the processing device to: receive component-level information associated with the components; generate weights for the correlation measures based on at least the component-level information; and determine weighted correlation measures for the components based on at least the weights and the correlation measures.

In some embodiments, the weights indicate a priority level for the components.

In some embodiments, executing the instructions further causes the processing device to: determine a second sequence in which the mitigation protocols are to be implemented based on at least the weighted correlation measures; and implement the mitigation protocols on the components in the second sequence.

In some embodiments, executing the instructions further causes the processing device to: determine subsets of mitigation protocols corresponding to the weighted correlation measures; and implement the subsets of mitigation protocols on the components based on at least the weighted correlation measures.

In some embodiments, the component-level information associated with the components comprises at least device characteristics, data usage telemetry, operational statistics, information associated with applications stored thereon, and historical threat vector assessment.

In some embodiments, the correlation measures indicate a level of co-linear relationship between the components.

In another aspect, a computer program product for component-level threat assessment in a computing environment is presented. The computer program product comprising a non-transitory computer-readable medium comprising code causing an apparatus to: capture state information associated with a computing environment, wherein the computing environment comprises components; determine correlation measures for the components based on at least the state information; determine threat vectors associated with the components; determine mitigation protocols to be implemented on the components in response to an incidence of the threat vectors on the components; determine a first sequence in which the mitigation protocols are to be implemented based on at least the correlation measures for the one or more components; and implement the mitigation protocols on the components in the first sequence to reduce a propagation effect of the threat vectors across the computing environment.

In yet another aspect, a method for component-level threat assessment in a computing environment is presented. The method comprising: capturing state information associated with a computing environment, wherein the computing environment comprises components; determining correlation measures for the components based on at least the state information; determining threat vectors associated with the components; determining mitigation protocols to be implemented on the components in response to an incidence of the threat vectors on the components; determining a first sequence in which the mitigation protocols are to be implemented based on at least the correlation measures for the components; and implementing the one or more mitigation protocols on the components in the first sequence to reduce a propagation effect of the threat vectors across the computing environment.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
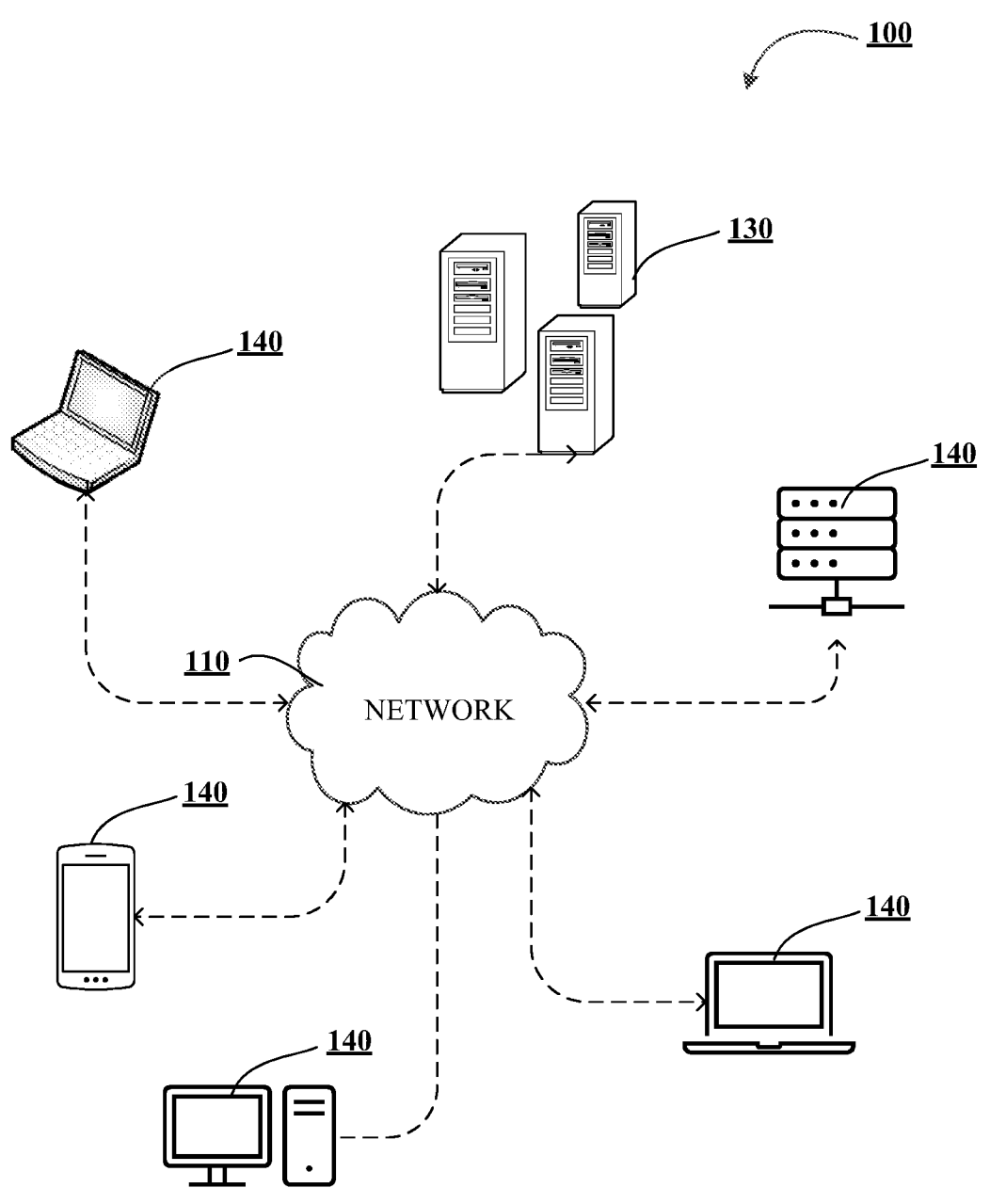
Figure 1B:
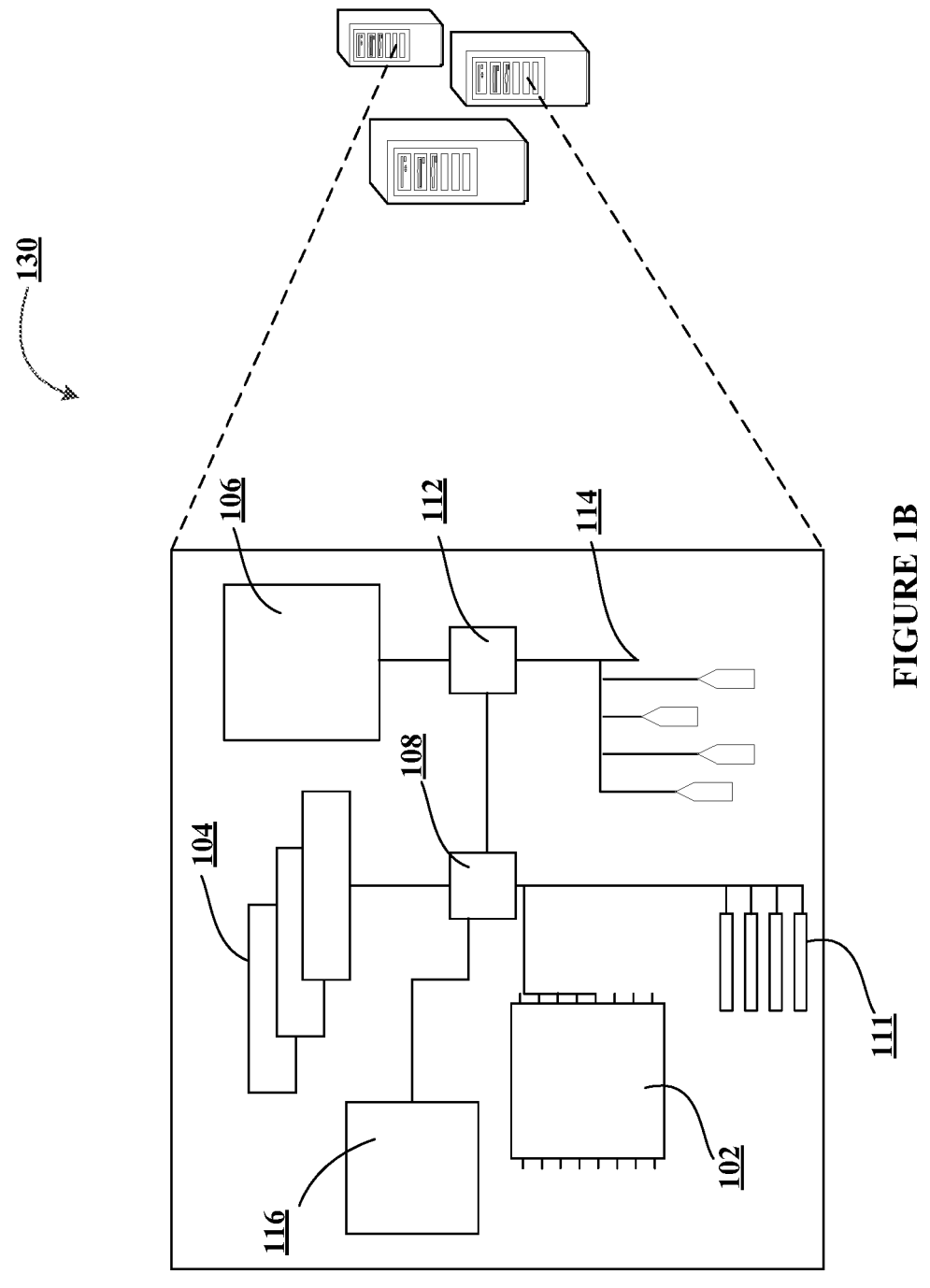
Figure 1C:
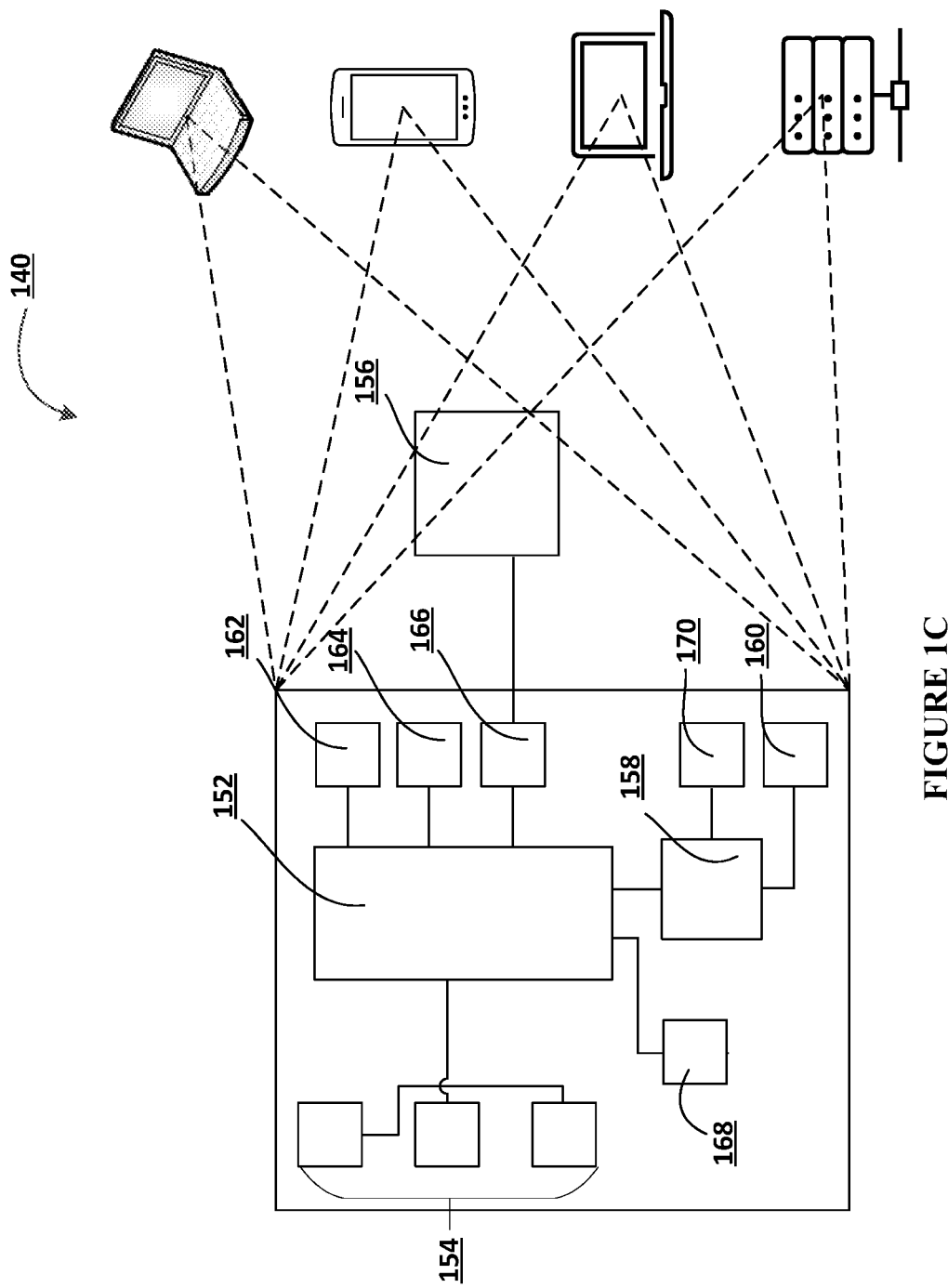

FIGS. 1A-1C illustrates technical components of an exemplary distributed computing environment for component-level threat assessment in a computing environment, in accordance with an embodiment of the disclosure;

FIG. 2 illustrates a process flow for component-level threat assessment in a computing environment, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Computing environments today host a wide variety of network services, which often depend on each other to provide and support network-based services and applications. Typically, when a component is affected by a threat vector, mitigation protocols corresponding to the threat vector are identified and subsequently implemented to reduce the effect of the threat vector on the component. However, such an implementation is often narrow in scope (e.g., specific to component), and does not always take into consideration other components that may not have directly been affected by the threat vector but are affected nonetheless due to their dependency on the affected component. Understanding such dependencies is essential for maintaining the well-being of the computing environment and its applications, particularly in the presence of network intrusions and malfunctions. Often, by the time the affected dependent components are identified, and the mitigation protocols implemented on them, network service disruptions may have already taken hold. In such cases, operations are typically paused until the components are serviced. Even if the dependent components are identified previously, most implementations often address all the dependent components at the same level of urgency. However, some components perform more business critical operations than others. Therefore, there is a need for efficient implementation of mitigation protocols across multiple affected components at a component-level according to operation criticality of their involvement in the computing environment.

Embodiments of the present disclosure may generate a correlation measure (e.g., connectivity rating) for the components within computing network (e.g., end-point device, servers, switches, repeaters, and/or the like) based on each component's connectivity to other components (e.g., the more connections to other components, the higher the correlation measure). In addition, embodiments of the present disclosure may determine weights for each component based on component-level information that identifies an importance of the component, and subsequently determine a weighted correlation measure for each component. The weighted correlation measure may be used to identify an order in which the components need to be addressed (e.g., implementation of mitigation protocols) to minimize the effect of threat vectors on the components and the computing environment as a whole. in instances where threat vectors affect said components. In particular, the present disclosure, (i) Captures state information associated with a computing environment, wherein the computing environment comprises components. The state information associated with the computing environment may provide a high-level analysis of the activity and topology by identifying various components (e.g., end-point devices) of the computing environment and interconnections therebetween. The captured state information may be used to identify dependencies between the various network components, (ii) Determines correlation measures (e.g., connectivity rating) for the components based on at least the state information. Correlation measures indicate a level of co-linear relationship between the components, i.e., the correlation measures may quantify the level of dependency between the components. The correlation measures may be weighted based on the operational criticality of each component. The operational criticality of a component may be determined based on component-level information, including device characteristics, data usage telemetry, operational statistics, information associated with applications stored thereon, historical threat vector assessment, and/or the like, (iii) Determines threat vectors associated with the components. Threat vectors may be security pressures to the component, such as but not limited to data exfiltration, component damage, operational exposure, or any other like exposure to which a component could be exposed, (iv) Determines mitigation protocols to be implemented on the components in response to an incidence of the threat vectors on the components. Mitigation protocols may include specific controls corresponding to the identified threat vectors that may be implemented on the component to identify, detect, monitor, regulate the effect of threat vectors on the component, (v) Determines a first sequence in which the mitigation protocols are to be implemented based on at least the correlation measures for the components. By determining a first sequence in which the mitigation protocols are to be implemented, components may be prioritized based on their correlation measure, (vi) Determines a second sequence in which the mitigation protocols are to be implemented based on at least the weighted correlation measures, considering a priority level for the components in addition to a level of co-linear relationship therebetween. By determining a second sequence in which the mitigation protocols are to be implemented, the system may not only reduce the propagating effect of the threat vector from the component being affected to other components that are dependent on the affected component, but also minimize loss of operation (e.g., operations downtime) of components that perform business critical operations.

What is more, the present disclosure provides a technical solution to a technical problem. The technical solution presented herein allows for a more accurate determination of mitigation protocol implementation that will effectively reduce the amount of computing resources, such as processing resources, storage resources, network resources, and/or the like, that are being used, providing a more accurate solution to problem, thus reducing the number of resources required to remedy any errors made due to a less accurate solution, remove manual input and waste from the implementation of the solution, thus improving speed and efficiency of the process and conserving computing resources, and determine an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for component-level threat assessment in a computing environment 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow for component-level threat assessment in a computing environment, in accordance with an embodiment of the disclosure. As shown in block 202, the process flow includes capturing state information associated with a computing environment, wherein the computing environment comprises components. In some embodiments, the state information associated with the computing environment may provide a high-level analysis of the activity and topology by identifying various components (e.g., end-point devices) of the computing environment and interconnections therebetween. The captured state information may be used to identify dependencies between the various network components. In this regard, in one aspect, the system may analyze network traffic across the computing network using any applicable techniques such as network-based discovery of dependencies, host-based discovery of dependencies, active perturbation of applications, and/or the like, to determine network dependencies between the various components. In general, a dependency or coupling may refer to a state in which one component uses a function of another. For example, the dependencies may include content dependencies, common dependencies, external dependencies, control dependencies, data dependencies, data-structure dependencies, temporal dependencies, dynamic dependencies, semantic dependencies, logical dependencies, and/or the like.

Next, as shown in block 204, the process flow includes determining correlation measures for the components based on at least the state information. In some embodiments, the correlation measures indicate a level of co-linear relationship between the components. In other words, the correlation measures may quantify the level of dependency between the components. As such, each component may be associated with a correlation measure indicating a dependency burden of that component. For example, a component who function is depended upon by other components within the computing environment may have a higher correlation measure than a component whose function depends upon other components. It is not uncommon for a component to be both dependent upon by other components and also be dependent on other components for successful operation. Such dependencies are identified, and the correlation measure is modified accordingly.

In some embodiments, the correlation measures may be weighted based on a priority level of each component. The priority level of a component may be determined based on specific operations executed by that component. For example, a component with low correlation score may be programmed to execute business critical applications and services. While the correlation score indicates a level of co-linear relationship of the component with other components in the computing network, it may not accurately reflect the importance of the component to overall operation. To determine the priority level of the components, the system may receive component-level information associated with each component. The component-level information may include device characteristics, data usage telemetry, operational statistics, information associated with applications stored thereon, historical threat vector assessment, and/or the like. Based on the component-level information, the system may generate weights that indicate a priority level for the components within the computing environment. These weights are then used to determine a weighted correlation measure for each component that accurately reflects the importance of the component to the overall operation.

Next, as shown in block 206, the process flow includes determining threat vectors associated with the components. In some embodiments, threat vectors may be security pressures to the component, such as but not limited to data exfiltration (e.g., extraction, loss, of intellectual property data, customer data, financial data, entity data, or any other type of data), component damage (e.g., viruses, physical damage, or the like), operational exposure (e.g., resource downtime, process downtime, manufacturing downtime, or the like), or any other like exposure to which a component could be exposed. For example, a threat vector may indicate various ways (e.g., access paths) through which a component may be accessed or used in an unauthorized manner, or element issues (e.g., gaps, redundancies, and/or deficiencies in elements of the components) that could result in potential exposure to the component. In some embodiments, to determine threat vectors associated with a particular component, the system may capture a threat landscape of the component and other components same or similar to that component. A threat landscape may include a collection of potential exposures that may affect a particular component within a domain or context. In one aspect, the threat landscape may identify vulnerabilities in the component, threat vectors involved, and observed trends. A threat landscape can be broad, including an entire range of potentials threats, or targeted at each component within the computing environment. Threat landscapes may often shift and vary based on the particular time horizon involved, including current threat landscapes, emergent threat landscape, and future threat landscapes, that reflect threat to deployments of new technology, often characterized by a low maturity regarding technical vulnerabilities.

Next, as shown in block 208, the process flow includes determining mitigation protocols to be implemented on the components in response to an incidence of the threat vectors on the components. In some embodiments, mitigation protocols may include specific controls corresponding to the identified threat vectors that may be implemented on the component to identify, detect, monitor, regulate the effect of threat vectors on the component. For example, controls may be configured to determine access authorization, thereby distinguishing the abilities of administrators from users, regulate network traffic associated with the component to detect and prohibit unauthorized access to the component, and/or the like. In this way, mitigation protocols with controls may be used to preempt the effect of a threat vector on the component. In some other embodiments, mitigation protocols may include a specific set of actions to be implemented in response to an incidence of a threat vector on a component. In one aspect, the mitigation protocols may be implemented to reduce the propagating effect of the threat vector from the component being affected to other components that are dependent on the affected component.

Next, as shown in block 210, the process flow includes determining a first sequence in which the mitigation protocols are to be implemented based on at least the correlation measures for the components. As described herein, most mitigation action implementations often address all the dependent components at the same level of urgency, even though some components perform more business critical operations than others. By determining a first sequence in which the mitigation protocols are to be implemented, the system may be able to prioritize components based on their correlation measure. For example, mitigation protocols are implemented on the component with the highest correlation measure first, followed by the component with the second highest correlation measure, and so on.

Next, as shown in block 212, the process flow includes implementing the mitigation protocols on the components in the first sequence to reduce a propagation effect of the threat vectors across the computing environment. By implementing the mitigation protocols in the first sequence, the system may reduce the propagating effect of the threat vector from the component being affected to other components that are dependent on the affected component. In embodiments where the components are associated with various levels of operational criticality, the system may determine a second sequence in which the mitigation protocols are to be implemented based on at least the weighted correlation measures, considering a priority level for the components in addition to a level of co-linear relationship therebetween. By determining a second sequence in which the mitigation protocols are to be implemented, the system may be able to prioritize components based on their weighted correlation measure. For example, mitigation protocols are implemented on the component with the highest weighted correlation measure first, followed by the component with the second highest weighted correlation measure, and so on. By implementing the mitigation protocols in the second sequence, the system may not only reduce the propagating effect of the threat vector from the component being affected to other components that are dependent on the affected component, but also minimize loss of operation (e.g., operations downtime) of components that perform business critical operations.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, micro-code, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for component-level threat assessment in a computing environment, the system comprising:

a processing device;

a non-transitory storage device containing instructions when executed by the processing device, causes the processing device to:

capture state information associated with a computing environment, wherein the computing environment comprises components, wherein each component is associated with component-level information, wherein the component-level information comprises device characteristics, data usage telemetry, operational statistics, information associated with applications stored thereon, and historical threat vector assessment;

determine correlation measures for the components based on at least the state information, wherein the correlation measures quantify a level of dependency between the components;

determine threat vectors associated with the components;

determine mitigation protocols to be implemented on the components in response to an incidence of the threat vectors on the components;

determine a first sequence in which the mitigation protocols are to be implemented based on at least the correlation measures for the components; and implement the mitigation protocols on the components in the first sequence to reduce a propagation effect of the threat vectors across the computing environment.

2. The system of claim 1, wherein executing the instructions further causes the processing device to:

generate weights for the correlation measures based on at least the component-level information; and determine weighted correlation measures for the components based on at least the weights and the correlation measures.

3. The system of claim 2, wherein the weights indicate a priority level for the components.

4. The system of claim 2, wherein executing the instructions further causes the processing device to:

determine a second sequence in which the mitigation protocols are to be implemented based on at least the weighted correlation measures; and implement the mitigation protocols on the components in the second sequence.

5. The system of claim 2, wherein executing the instructions further causes the processing device to:

determine subsets of mitigation protocols corresponding to the weighted correlation measures; and implement the subsets of mitigation protocols on the components based on at least the weighted correlation measures.

6. The system of claim 1, wherein the correlation measures indicate a level of co-linear relationship between the components.

7. A computer program product for component-level threat assessment in a computing environment, the computer program product comprising a non-transitory computer-readable medium comprising code causing an apparatus to:

capture state information associated with a computing environment, wherein the computing environment comprises components, wherein each component is associated with component-level information, wherein the component-level information comprises device characteristics, data usage telemetry, operational statistics, information associated with applications stored thereon, and historical threat vector assessment;

determine correlation measures for the components based on at least the state information, wherein the correlation measures quantify a level of dependency between the components;

determine threat vectors associated with the components;

determine mitigation protocols to be implemented on the components in response to an incidence of the threat vectors on the components;

determine a first sequence in which the mitigation protocols are to be implemented based on at least the correlation measures for the components; and implement the mitigation protocols on the components in the first sequence to reduce a propagation effect of the threat vectors across the computing environment.

8. The computer program product of claim 7, wherein the computer program product is further configured to:

generate one or more weights for the correlation measures based on at least the component-level information; and determine weighted correlation measures for the components based on at least the weights and the correlation measures.

9. The computer program product of claim 8, wherein the weights indicate a priority level for the components.

10. The computer program product of claim 8, wherein the computer program product is further configured to:

determine a second sequence in which the mitigation protocols are to be implemented based on at least the weighted correlation measures; and implement the mitigation protocols on the components in the second sequence.

11. The computer program product of claim 8, wherein the computer program product is further configured to:

determine subsets of mitigation protocols corresponding to the weighted correlation measures; and implement the subsets of mitigation protocols on the components based on at least the weighted correlation measures.

12. The computer program product of claim 7, wherein the correlation measures indicate a level of co-linear relationship between the components.

13. A method for component-level threat assessment in a computing environment, the method comprising:

capturing state information associated with a computing environment, wherein the computing environment comprises components, wherein each component is associated with component-level information, wherein the component-level information comprises device characteristics, data usage telemetry, operational statistics, information associated with applications stored thereon, and historical threat vector assessment;

determining correlation measures for the components based on at least the state information, wherein the correlation measures quantify a level of dependency between the components;

determining threat vectors associated with the components;

determining mitigation protocols to be implemented on the components in response to an incidence of the threat vectors on the components;

determining a first sequence in which the mitigation protocols are to be implemented based on at least the correlation measures for the components; and implementing the mitigation protocols on the components in the first sequence to reduce a propagation effect of the threat vectors across the computing environment.

14. The method of claim 13, wherein the method further comprises:

generating weights for the correlation measures based on at least the component-level information; and determining weighted correlation measures for the components based on at least the weights and the correlation measures.

15. The method of claim 14, wherein the weights indicate a priority level for the components.

16. The method of claim 14, wherein the method further comprises:

determining a second sequence in which the mitigation protocols are to be implemented based on at least the weighted correlation measures; and implementing the mitigation protocols on the components in the second sequence.

17. The method of claim 14, wherein the method further comprises:

determining subsets of mitigation protocols corresponding to the weighted correlation measures; and implementing the subsets of mitigation protocols on the components based on at least the weighted correlation measures.

* * * * *